United States Patent [19]

Akiyama et al.

[11] Patent Number: 5,461,527
[45] Date of Patent: Oct. 24, 1995

[54] MAGNETO-RESISTIVE HEAD

[75] Inventors: Junichi Akiyama, Kawasaki; Yuichi Ohsawa; Hitoshi Iwasaki, both of Yokohama; Reiko Kondoh, Kawasaki; Kohichi Tateyama; Toshihiko Ohta, both of Yokohama; Hiroaki Yoda, Kawasaki, all of Japan

[73] Assignee: Kabushiki Kaisha Toshiba, Kawasaki, Japan

[21] Appl. No.: 340,448

[22] Filed: Nov. 14, 1994

Related U.S. Application Data

[63] Continuation of Ser. No. 954,043, Sep. 30, 1992, abandoned.

[30] Foreign Application Priority Data

Sep. 30, 1991 [JP] Japan .................................. 3-278640

[51] Int. Cl.⁶ ...................................................... G11B 5/39
[52] U.S. Cl. ........................................................... 360/113
[58] Field of Search .................................. 360/113, 114, 360/122, 125, 126; 29/603

[56] References Cited

U.S. PATENT DOCUMENTS

| | | | |
|---|---|---|---|
| 3,840,898 | 10/1974 | Bajorek et al. | 360/113 |
| 4,103,315 | 7/1978 | Hempstead et al. | 360/113 |
| 4,616,281 | 10/1986 | Nakamura | 360/113 |
| 4,713,708 | 12/1987 | Krounbi et al. | 360/113 |
| 4,860,138 | 8/1989 | Vinal et al. | 360/113 |
| 4,907,114 | 3/1990 | Shiiki et al. | 360/113 |
| 4,949,039 | 8/1990 | Grunberg | 360/113 |
| 5,159,513 | 10/1992 | Dieny et al. | 360/113 |

FOREIGN PATENT DOCUMENTS

| | | |
|---|---|---|
| 53-25646 | 7/1978 | Japan . |
| 53-37205 | 10/1978 | Japan . |
| 53-37206 | 10/1978 | Japan . |
| 0548291 | 4/1979 | Japan . |
| 56-40406 | 9/1981 | Japan . |

OTHER PUBLICATIONS

A Magnetoresistive Readout Transducer Robert P. Hunt IEEE MAG–7, pp. 150–154 (1970).
Journal of Applied Physics vol. 52(3). pp. 2474–2476 Mar. 1981 The Saturation Magnetostriction of Permalloy Films, E. Klokholm, et al.
Unshielded MR Elements With Patterned Exchange Biasing, C. Tsang IEEE Trans. MAG–25, 3692–3694 1989.
MR 86–37 K. Shiba, et al. Electronics, Information and Communication Engineers "Data or Magnetic Recording Research" pp. 1–8.
Autumn Meet of Japan Institute of Metals, (543) p. 422, (1990) "Summary of General Lecture".
Exchange Induced Unidirectional Anisotropy At FeMn–Ni80Fe20 Interfaces; C. Tsang, et al. Journal Of Applied Physics vol. 52, pp. 2471–2473 (1982).
Temperature Dependence of Inidirectional Anisotropy Effects in the Permalloy–FeMn Systems; C. Tsang, et al. Journal of Applied Physics vol. 53, (1982) pp. 2605–2607.
Exchange Coupled NiFe–TbCo Thin Films for Use in Self–Biased Magnetoresistive Heads; William C. Cain, et al. IEEE Trans. MAG–24, pp. 2609–2611 (1988).

*Primary Examiner*—John H. Wolff
*Assistant Examiner*—David L. Ometz
*Attorney, Agent, or Firm*—Oblon, Spivak, McClelland, Maier, & Neustadt

[57] ABSTRACT

A member having a first and a second magnetic layer are magnetostatically coupled and laminated and the first magnetic layer formed on a magneto-resistive element, for creating the exchange coupling on the magneto-resistive element and the first magnetic layer. The member is formed by sequentially laminating a first ferromagnetic layer magnetized in a sense along the direction of the longitudinal bias of the magneto-resistive element, non-magnetic layer and second ferromagnetic layer magnetized in a direction opposite to the magnetized direction of the first ferromagnetic layer, for example.

11 Claims, 7 Drawing Sheets

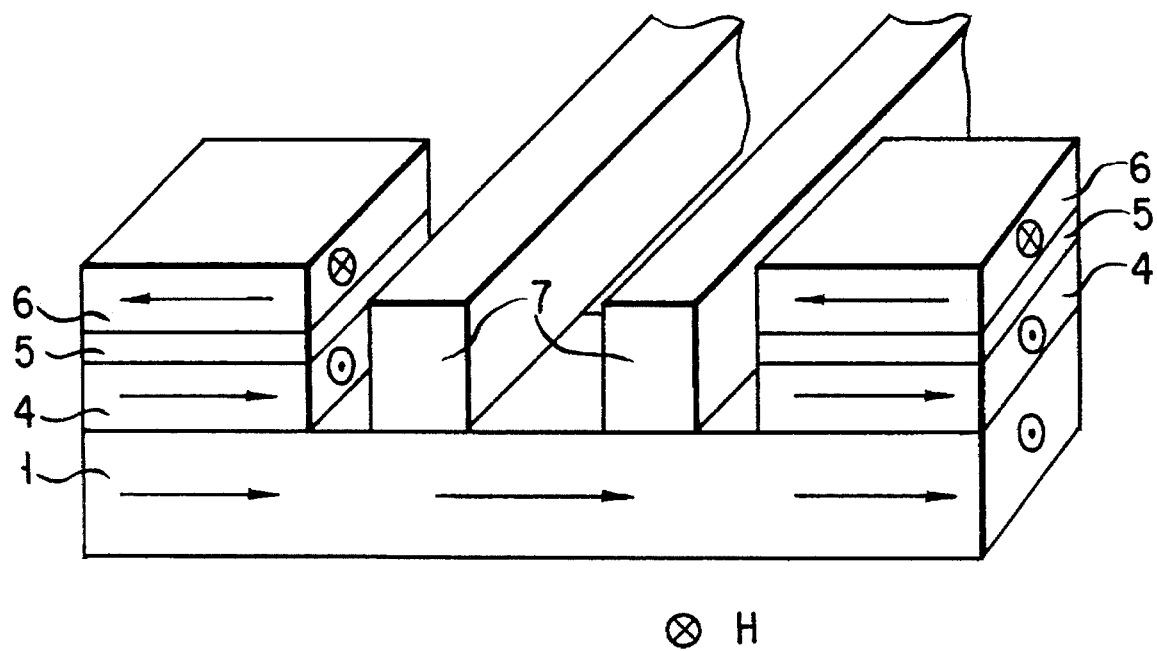
F I G. 3
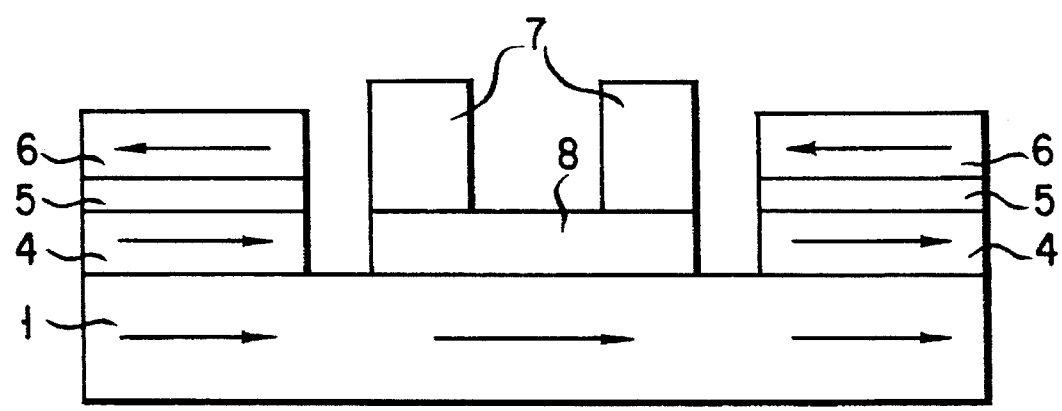
F I G. 4

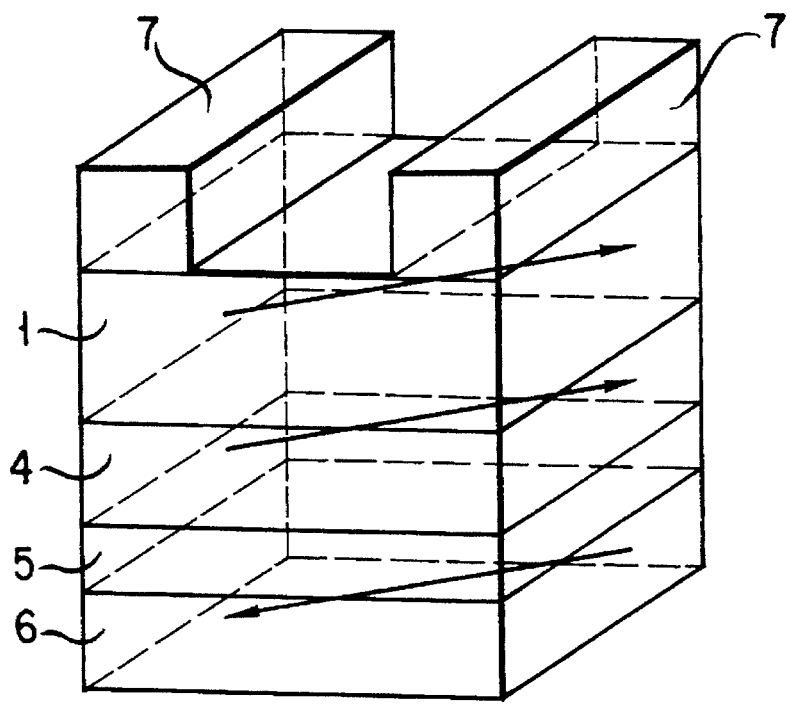
F I G. 9
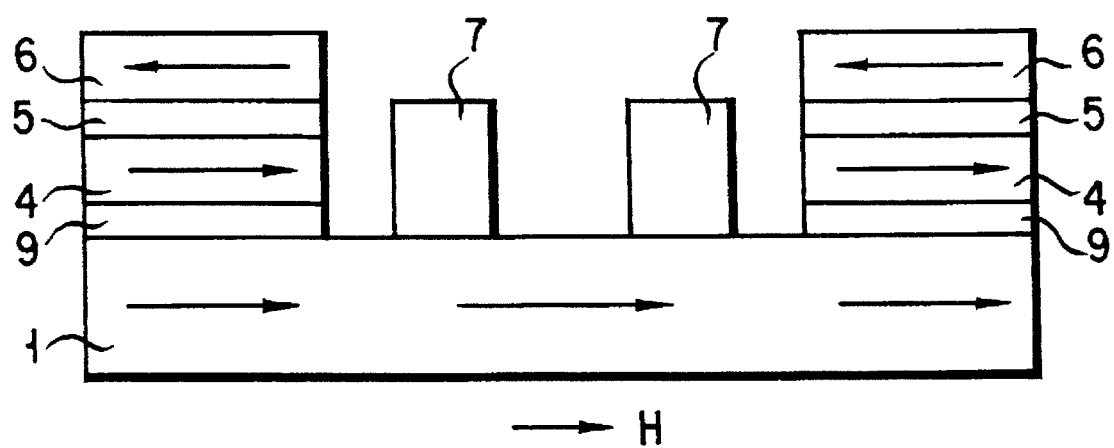
F I G. 10

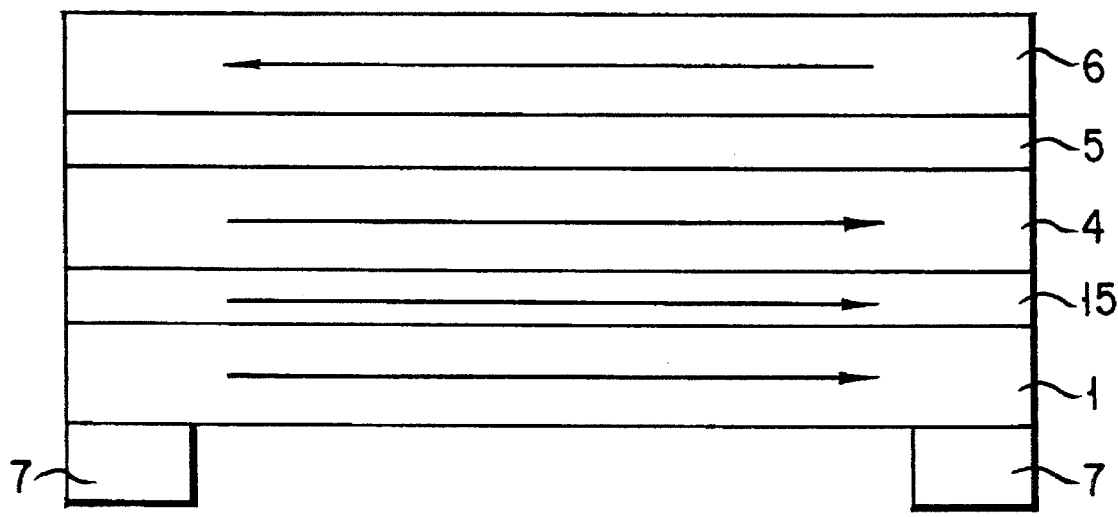
F I G. 14
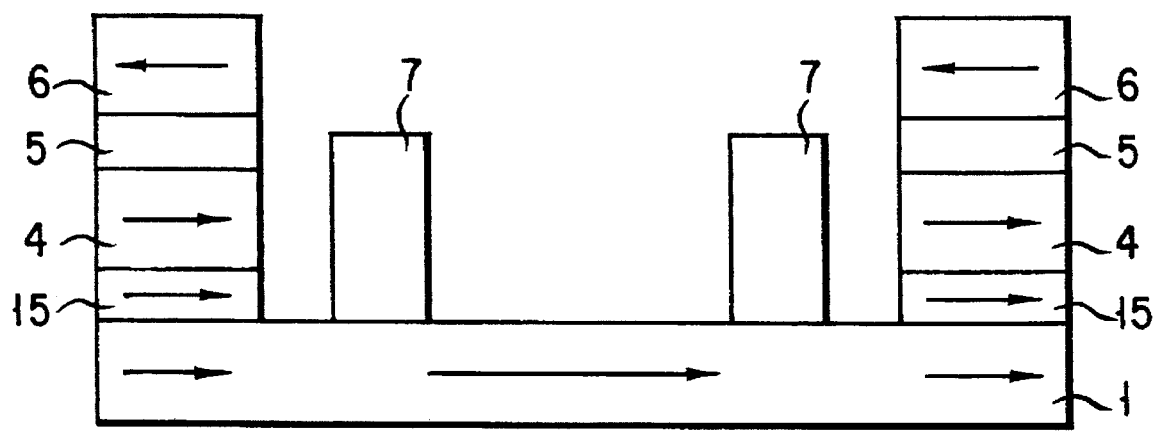
F I G. 15

MAGNETO-RESISTIVE HEAD

This application is a continuation of application Ser. No. 07/954,043, filed on Sep. 30, 1992, now abandoned.

BACKGROUND OF THE INVENTION

1. Field of the Invention

This invention relates to a magneto-resistive head used as a reproducing head in a magnetic recording/reproducing device such as a hard disk drive and VTR.

2. Description of the Related Art

As a method of reproducing a signal recorded on a magnetic recording medium, a method of moving a so-called ring head having a coil relative to a recording medium to induce a voltage in the coil by electromagnetic induction and detecting the induced voltage is widely used. On the other hand, as is disclosed in IEEE MAG-7, 150, (1971), for example, a magneto-resistive head is known as a highly sensitive head for detecting the signal magnetic field on the recording medium. The magneto-resistive head utilizes a phenomenon that the electrical resistance of a certain type of ferromagnetic material varies with the intensity of an external magnetic field.

In recent years, it has been desired to decrease the size of a magnetic recording device and increase the capacity thereof. For this reason, the relative speed of the head to the recording medium is increasingly made lower. This type of magneto-resistive head (which is hereinafter referred to as an MR head) has an advantage that a large reproduced output can be derived irrespective of the relative speed with respect to the recording medium. Therefore, the MR head having the above advantage becomes more important.

The MR head has a magneto-resistive element (film) to which two types of bias magnetic fields are applied. One of the two type of bias magnetic fields is a transversal bias magnetic field which is applied in a direction of an axis of difficult magnetization of the MR element. The transversal bias magnetic field is a bias magnetic field for setting the operating point of the MR element into a linear region in which a detection signal varies in proportion to an external signal and results in a highly sensitive reproduction of a signal.

One example of a method for applying the transversal bias magnetic field is disclosed in Japanese Patent Publication Nos. S53-37205 and S56-40406. That is, there is provided a self-bias method in which a magneto-resistive element and a soft magnetic layer with a non-magnetic layer disposed therebetween are used and a magnetic field created by the sense current is used as the transversal bias. The soft magnetic layer is generally called a soft adjacent layer (SAL). Another example of a method for applying the transversal bias magnetic field is a shunt bias method as is disclosed in Japanese Patent Publication No. S53-25646. Further, another example of a method for applying the transversal bias magnetic field is a method effected by passing a current in the adjacent coil as is disclosed in Japanese Patent Publication No. S53-37206. Still another example of a method for applying the transversal bias magnetic field is a method effected by magnetizing a hard magnetic layer adjacent to the magneto-resistive element as is disclosed in Japanese Patent Publication No. S54-8291.

The other bias magnetic field applied to the MR device is a magnetic field called a longitudinal bias applied in a direction parallel to an axis of easy magnetization of the MR element. The longitudinal bias magnetic field acts to suppress the Barkhausen noise caused by the multi-magnetic domain structure by forming the MR device in the single-magnetic domain structure. Various methods of applying the longitudinal bias are proposed in the prior art. For example, the technique of applying the uniform longitudinal bias to the magneto-resistive element by the exchange coupling between the antiferromagnetic layer and the ferromagnetic layer is disclosed in U.S. Pat. No. 4,103,315. Further, the experiment that the longitudinal bias can be applied to the magneto-resistive element when an FeMn layer is used as the antiferromagnetic layer and a $Ni_{80}Fe_{20}$ layer is used as the magneto-resistive element is reported in JOURNAL OF APPLIED PHYSICS VOL. 52,2474 (1981). The experiment that the longitudinal bias can be applied to a magnetic field sensitive region of the magneto-resistive element when the FeMn layer is disposed only on the end portion of the magneto-resistive element is reported in IEEE TRANS. MAG-25, 3692 (1989). In both of the above cases, the Barkhausen noise can be suppressed by use of the longitudinal bias magnetic field.

A method effected by using a magnetized ferromagnetic layer in the same manner as in the case of applying the transversal bias is proposed as another method of applying the longitudinal bias. For example, a method of applying a bias to the magneto-resistive element with a thin insulation layer disposed between the magneto-resistive element and the magnetized ferromagnetic layer is proposed in U.S. Pat. No. 3,840,898. In this case, the longitudinal bias, transversal bias and the bias in the intermediate direction can be selectively set by adequately selecting the direction of the magnetization. Further, a method of applying the longitudinal bias by disposing the magnetized CoP layer on the end portion of the magneto-resistive element of the yoke type MR head is introduced in the institution paper MR86-37 from the magnetic recording institution of the Institute of Electronics and Communication Engineers of Japan.

As described above, various methods of applying the longitudinal bias to the MR element are proposed, but when the above methods are applied to a reproducing head for the hard disk drive, the following problems occur.

$\gamma$-FeMn, a known material which displays a strong antiferromagnetic property at room temperatures, is exchange-coupled with the magneto-resistive element such as a NiFe layer and is used when the antiferromagnetic layer and the magneto-resistive element are exchange-coupled with each other. For example, as is reported in Japanese Metal Institution (543), Autumn, 1990, the material may give an important influence on the reliability of the device since Mn is liable to be oxidized. When $\gamma$-FeMn is formed by sputtering, $\alpha$-FnMn may be formed as is pointed out in JOURNAL OF APPLIED PHYSICS VOL 52,2471, (1981). Therefore, it is difficult to obtain stable $\gamma$-FeMn as an industrial product.

The magnitude of the longitudinal bias is preferably set to such a value as to cancel the demagnetizing field in the end portion of the magneto-resistive element. If the magnitude of the longitudinal bias is smaller than the magnitude which is necessary to cancel the demagnetizing field, the magneto-resistive element cannot be formed in the single-magnetic domain structure. On the other hand, if the magnitude of the longitudinal bias is larger than the magnitude which is just necessary to cancel the demagnetizing field, the sensitivity of the magneto-resistive element is lowered. The magnitude of the demagnetizing field depends on the shape of the MR element, that is, the track width and film thickness thereof. Therefore, according to the specification of the head, it is necessary to change the magnitude of exchange energy.

However, as is disclosed in JOURNAL OF APPLIED PHYSICS VOL. 52,2471 (1981), it is necessary to change the film thickness of the NiFe layer or FeMn layer in order to control the magnitude of the exchange energy between the FeMn layer and NiFe layer. Since the film thickness of the NiFe layer is closely related to the characteristic of the head, the film thickness cannot be freely changed. When the thickness of the FeMn layer is increased, α-FnMn may be formed.

Thus, it is practically difficult to change the exchange energy between the antiferromagnetic material layer and the magneto-resistive element according to the specification of the head.

Further, as is pointed out in JOURNAL OF APPLIED PHYSICS VOL. 53,2605 (1982), the dependency of the exchange coupling energy between the FeMn layer and the NiFe layer on temperature is large. Therefore, the characteristic of the device may be changed by an influence by heat generation due to the sense current or by the environment of application.

In order to solve the problem which may be caused when the FeMn layer is used as the antiferromagnetic layer, a method of exchange-coupling a TbCo layer with the NiFe layer is introduced in IEEE TRANS. MAG-24,2609 (1988). However, the material is liable to be oxidized and the reliability thereof cannot be maintained for a long period of time even if the environment of application is extremely limited.

A method of applying the longitudinal bias by use of the magnetized ferromagnetic layer is effective when the MR element is disposed in position apart from the recording medium as in the yoke type MR head. However, when the MR element is disposed near the recording medium as in a shield type MR head, there is a possibility that the recording medium may be demagnetized by the leakage magnetic field from the ferromagnetic layer, that is, recorded information may be erased. In order to prevent the recording medium from being demagnetized, the coercive force of the ferromagnetic layer may be reduced. However, in this case, the direction of magnetization of the ferromagnetic layer may be changed by the leakage magnetic field from the recording medium and the longitudinal bias may not be applied.

As described above, the method of applying the longitudinal bias to the magneto-resistive element by the exchange coupling between the antiferromagnetic layer and the ferromagnetic layer has a problem that the long-term reliability cannot be attained since the material of the antiferromagnetic layer generally tends to be oxidized. Further, the method of applying the longitudinal bias by use of the magnetized ferromagnetic layer has no problem when the antiferromagnetic layer is used. However, in a case wherein the MR element is disposed near the recording medium as in the shield type MR head, a problem that magnetic information recorded on the recording medium is erased by the leakage magnetic field from the ferromagnetic layer will occur when a sufficiently large longitudinal bias is applied.

SUMMARY OF THE INVENTION

An object of this invention is to provide a magneto-resistive head capable of effectively applying the longitudinal bias to the magneto-resistive element by use of a ferromagnetic material without generating an unwanted leakage magnetic field.

The above object can be attained by a magneto-resistive head having the following construction. That is, the magneto-resistive head comprises a magneto-resistive element having a first region for sensing a magnetic field and second regions disposed on both sides of the first region;

conductive leads disposed on the second regions of the magneto-resistive element; and exchange coupling creating means having a first and a second magnetic layer are magnetostatically coupled and laminated with two-layered structure and said first magnetic layer formed on said magneto-resistive element, for creating the exchange coupling on the magneto-resistive element and said first magnetic layer.

The above object can be attained by a magneto-resistive head having the following construction. That is, the magneto-resistive head comprises a magneto-resistive element having a magnetic field sensitive region;

a first non-magnetic layer formed on one surface of the magnetic field sensitive region of the magneto-resistive element;

a conductive soft magnetic layer selectively formed on the first non-magnetic layer and an region of the one surface of the magneto-resistive element which is not covered with the first non-magnetic layer;

a first ferromagnetic layer formed on the conductive soft magnetic layer and magnetized in a preset sense along the longitudinal bias direction of the magneto-resistive element;

a second non-magnetic layer formed on the first ferromagnetic layer; and a second ferromagnetic layer formed on the second non-magnetic layer and magnetized in a direction opposite to the magnetized direction of the first ferromagnetic layer in the longitudinal bias direction of the magneto-resistive element.

The above object can be attained by a magneto-resistive head having the following construction. That is, the magneto-resistive head comprises a magneto-resistive element having a magnetic field sensitive region;

a first non-magnetic layer formed on one surface of the magnetic field sensitive region of the magneto-resistive element;

a conductive soft magnetic layer selectively formed on the first non-magnetic layer and a region of the one surface of the magneto-resistive element which is not covered with the first non-magnetic layer;

a first ferromagnetic layer formed on the other surface of the magneto-resistive element and magnetized in a preset sense along the longitudinal bias direction of the magneto-resistive element;

a second non-magnetic layer formed on the first ferromagnetic layer; and a second ferromagnetic layer formed on the second non-magnetic layer and magnetized in a direction opposite to the magnetized direction of the first ferromagnetic layer in the longitudinal bias direction of the magneto-resistive element.

The above object can be attained by a magneto-resistive head having the following construction. That is, the magneto-resistive head comprises a magneto-resistive element having a magnetic field sensitive region;

a first non-magnetic layer selectively formed on the magnetic field sensitive region of the magneto-resistive element;

a first ferromagnetic layer formed on the first non-magnetic layer and an region of the magneto-resistive element which is not covered with the first non-magnetic layer and magnetized in a preset sense along the longitudinal bias direction of the magneto-resistive element;

a second non-magnetic layer formed on the first ferromagnetic layer; and a second ferromagnetic layer formed on the second non-magnetic layer and magnetized in a direction opposite to the magnetized direction of the first ferromagnetic layer in the longitudinal bias direction of the magneto-resistive element.

The above magneto-resistive heads are operated as follows. That is, the longitudinal bias acts on the magneto-resistive element by the exchange coupling so as to prevent occurrence of a partial magnetic domain such as a 90-degree magnetic domain wall, thereby significantly suppressing occurrence of the Barkhausen noise.

Since the first ferromagnetic layer is magnetostatically coupled with the second ferromagnetic layer which is formed over the first ferromagnetic layer with the non-magnetic layer disposed therebetween, the magnetic fluxes respectively generated by the first and second ferromagnetic layers create a closed loop, thereby suppressing the leakage magnetic fluxes generated from the end portions of the ferromagnetic layers to an extremely small value. Therefore, even with a structure in which the magneto-resistive element is disposed near the recording medium as in the shield type MR head, the possibility that the magnetization on the recording medium is demagnetized by the leakage flux becomes low. Further, since it becomes difficult for the leakage flux to enter the magneto-resistive element, a constant bias can be easily applied to an active region, making it possible to attain preferable reproduction and response characteristics.

Further, the strength of the exchange coupling between the first ferromagnetic layer and the magneto-resistive element can be adjusted by disposing the second non-magnetic layer as a barrier layer on the interface between the first ferromagnetic layer and the magneto-resistive element, thus making it possible to adequately adjust the intensity of the longitudinal bias magnetic field. The non-magnetic layer functions as a diffusion preventing layer for preventing diffusion on the interface between the ferromagnetic layer and the magneto-resistive element which may be caused by heat generated at the time of application of the MR head or in the MR head manufacturing process, thus enhancing the reliability of the MR head.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a perspective view of an MR head experimentally manufactured to determine the effect of the first embodiment;

FIG. 4 is a cross sectional view of an MR head according to a third embodiment of this invention;

FIG. 9 is a perspective view of an MR head according to the seventh embodiment of this invention;

FIG. 10 is a cross sectional view of an MR head according to an eighth embodiment of this invention;

FIG. 14 is a cross sectional view of an MR head according to a twelfth embodiment of this invention; and FIG. 15 is a cross sectional view of an MR head according to a thirteenth embodiment of this invention.

DETAILED DESCRIPTION OF THE PREFERRED EMBODIMENTS

There will now be described an embodiment of this invention with reference to the accompanying drawings.

Embodiment 1

Figure 1:
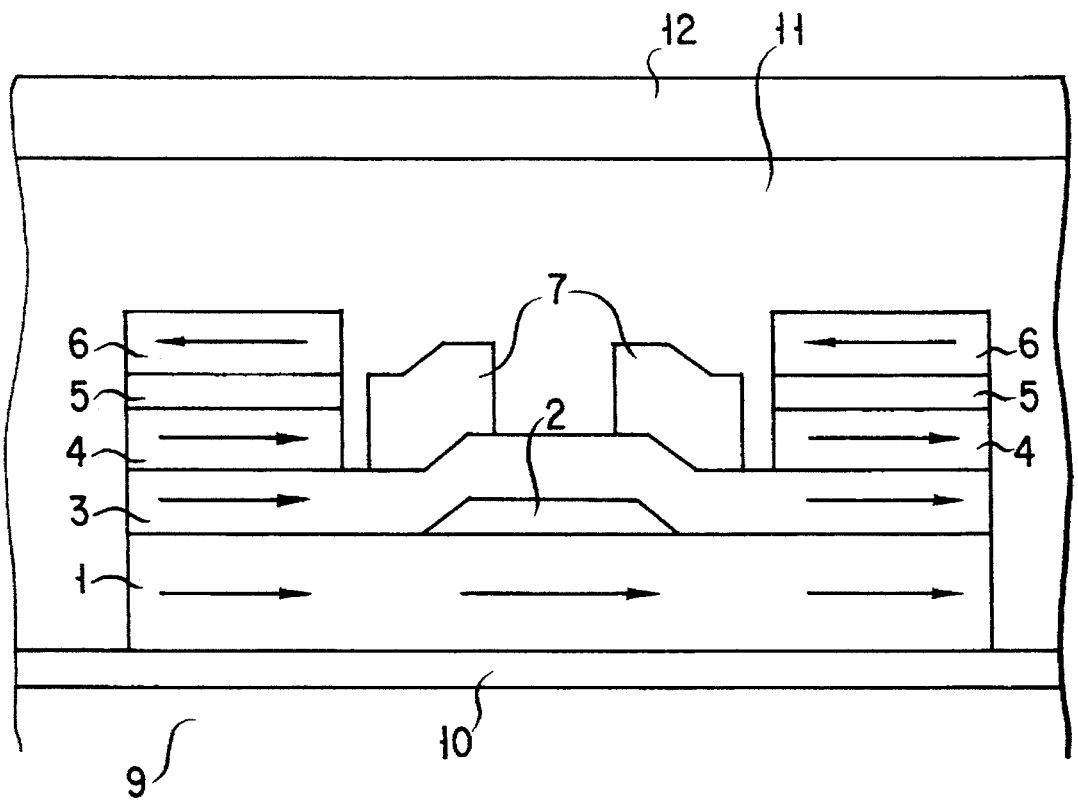
FIG. 1 is a cross sectional view of an MR head according to a first embodiment of this invention.

FIG. 1 is a cross sectional view schematically showing the construction of an MR head according to a first embodiment of this invention. A non-magnetic insulation layer 10 (for example, SiNx with a thickness of 100 nm) is formed on a ferromagnetic material base plate 9 (MnZn ferrite, for example). A stripe-form magneto-resistive element 1 (for example, NiFe with a thickness of approx. 30 nm) is formed on the non-magnetic insulation layer 10. A first non-magnetic layer 2 (for example, Ti with a thickness of approx. 20 nm) is formed on a central portion which is an active region (magnetic field sensitive region) of the magneto-resistive element 1. A conductive soft magnetic layer 3 (for example, Co-based amorphous with a thickness of approx. 30 nm) is formed on the first non-magnetic layer 2 and a region of the magneto-resistive element 1 which is not covered with the non-magnetic layer 2.

Hard magnetic layers (for example, Co-20% Pt with a thickness of approx. 45 nm, coercive force Hc of 120 kA/m and residual flux density Br of 0.8 T) serving as first ferromagnetic layers 4, non-magnetic layers 5 (for example, SiNx with a thickness of approx. 10 nm) and hard magnetic layers (for example, Co-10% Pt with a thickness of approx. 25 nm, Hc of 50 kA/m and Br of 1.4 T) serving as second ferromagnetic layers 6 for application of the longitudinal bias are sequentially laminated on two end portions of the soft magnetic layer 3 in the longitudinal direction of the magneto-resistive element 1. In this case, the ferromagnetic layer 4 is magnetized in one sense (x direction) along the longitudinal direction of the magneto-resistive element 1. The ferromagnetic layer 6 is magnetized in a direction (−x direction) opposite to the direction of the magnetization of the ferromagnetic layer 4.

The x direction coincides with the direction of the longitudinal bias created in the magneto-resistive element 1. In the following description, it is considered that the longitudinal direction of the magneto-resistive element 1 is the same as the direction of the longitudinal bias created in the magneto-resistive element 1.

Further, two conductive leads (for example, Al) 7 for electrically connecting the two end portions of the magnetic field sensitive region of the magneto-resistive element 1 to an external circuit are formed on the conductive soft magnetic layer 3.

Thus, the characteristic construction of this embodiment is that the conductive leads 7 are formed on the two end portions of the magnetic field sensitive region of the magneto-resistive element 1 and the three-layered bodies serving as the exchange coupling creating means for creating the exchange coupling are disposed on both sides of the conductive leads 7. Each of the three-layered bodies is formed by sequentially laminating the first ferromagnetic layer 4, non-magnetic layer 5 and second ferromagnetic layer 6.

The whole portion of the basic structure of the above MR head is covered with a non-magnetic insulation film 11 (for example, $SiO_2$ film with a thickness of 2 μm) and a shielding soft magnetic layer 12 (for example, Co-based amorphous layer with a thickness of approx. 2 μm) is formed on the non-magnetic insulation film 11.

The process for manufacturing the MR head is briefly described below. First, a non-magnetic insulation film 10 and a magneto-resistive element 1 are sequentially formed on the entire surface of the ferromagnetic material base plate 9. Further, a first non-magnetic layer 2 is formed on the structure. After this, the non-magnetic layer 2 is patterned to leave only the central portion thereof and then a conductive soft magnetic layer 3 is formed on the entire surface of the structure. Next, the magneto-resistive element 1 and soft magnetic layer 3 are patterned in a preset stripe form (which is called an MR stripe form). Then, a first ferromagnetic layer 4 is formed and magnetized in the x direction. After this, a first non-magnetic layer 5 is formed and a second ferromagnetic layer 6 is formed. Then, the second ferromagnetic layer 6 is magnetized in the x-direction. Next, the laminated body of the ferromagnetic layer 4, non-magnetic layer 5 and ferromagnetic layer 6 is patterned to leave portions thereof lying on the end portions of the magneto-resistive element 1. After conductive leads 7 are formed on the soft magnetic layer 3, a non-magnetic insulation film 11 and a shielding soft magnetic layer 12 are sequentially formed to complete the MR head shown in FIG. 1.

The reproducing characteristic was measured by using the MR head of the above structure and reproducing a signal recorded on the magnetic disk of metal medium at 1 kFCI. According to the measurement, no discontinuous jump was observed in the reproduced waveform and a reproduced waveform free from the influence by the Barkhausen noise was obtained.

In this embodiment, the conductive soft magnetic layer 3 is provided to bias (in the transversal direction) the operating point of the magneto-resistive element 1. That is, when a D.C. current is caused to flow in the soft magnetic layer 3, the magnetization of the soft magnetic layer 3 caused by the magnetic field which is induced by the current and the magnetization of the magneto-resistive element 1 are magnetostatically coupled to apply an operating point bias to the magneto-resistive element 1.

Embodiment 2

Figure 2:
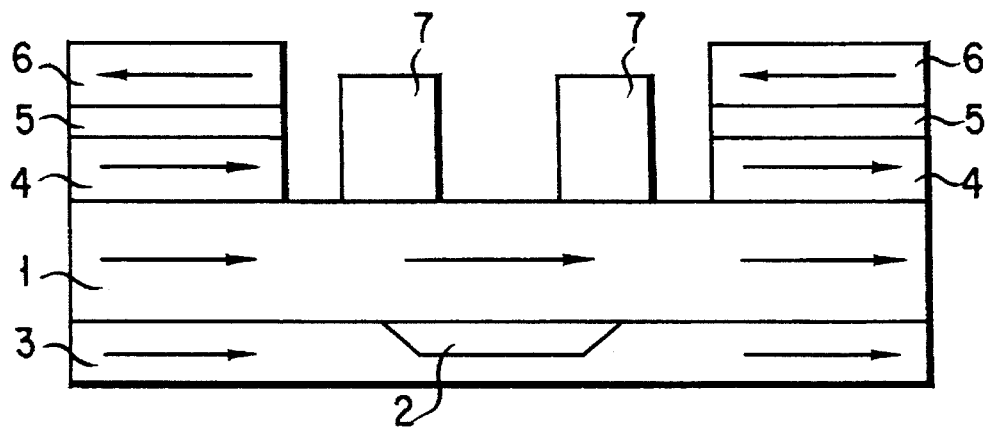
FIG. 2 is a cross sectional view of an MR head according to a second embodiment of this invention.

In the embodiment 1, the non-magnetic layer 2 and conductive soft magnetic layer 3 are formed on the magneto-resistive element 1, but in contrast, in the embodiment 2 shown in FIG. 2, a non-magnetic layer 2 and a conductive soft magnetic layer 3 are formed under the magneto-resistive element 1. With this structure, the same effect as that of the embodiment 1 can be obtained. However, when the magneto-resistive element 1 is formed in the upper position, it is preferable to form the magneto-resistive element 1 in a flat configuration. Therefore, in this case, it is preferable to partly depress the conductive soft magnetic layer 3 by an amount corresponding to the thickness of the non-magnetic layer 2 lying in the interface region between the magneto-resistive element 1 and the conductive soft magnetic layer 3 or form the magneto-resistive element 1 after forming and patterning the non-magnetic layer 2 and then making flat the non-magnetic layer by ion trimming or the like.

In the embodiments 1 and 2, an MR element having such a structure as shown in FIG. 3 from which the non-magnetic layer 2 and conductive soft magnetic layer 3 are omitted in order to determine the longitudinal bias operation is formed. The items are the same as those of the first embodiment except that the non-magnetic layer 2 and conductive soft magnetic layer 3 of the embodiment 1 are omitted. The MR element was disposed in a Helmholtz coil to which an external magnetic field could be applied, an external magnetic field H was applied in the height direction of the magneto-resistive element 1, and the R-H curve indicating the relation between the external application magnetic field H and the resistance of the magneto-resistive element 1 was measured. According to the measurement, a discontinuous jump indicating occurrence of the Barkhausen jump noise could not be observed in the curve.

A hard magnetic layer (Co-20% Pt with a thickness of approx. 45 nm, Hc of 120 kA/m and Br of 0.8 T), that is, the first ferromagnetic layer 4 which is one of the laminated ferromagnetic layers 4 and 6 and the non-magnetic layer 5 (SiNx with a thickness of approx. 10 nm) were kept unchanged and the film thickness of the second ferromagnetic layer 6 was changed from 25 nm to 45 nm. Like the embodiment 1, the directions of magnetization of the first and second ferromagnetic layers 4 and 6 were set to be opposite to each other.

The R-H curve was measured by use of the MR head with the above structure and a discontinuous jump indicating occurrence of the Barkhausen noise was observed.

Next, the first ferromagnetic layer 4 and the non-magnetic layer 5 were formed in the same manner as described above and a soft magnetic layer (Co-based amorphous with Hc of 30 A/m and Bs of 0.8 T) was formed to a thickness of approx. 45 nm as the second ferromagnetic layer 6 instead of the hard magnetic layer. In this case, the ferromagnetic layer 6 was not magnetized. An MR head with the above structure was formed and the R-H curve was measured as in the former case, and no discontinuous jump was observed. This may follow that the Barkhausen noise can be suppressed.

An MR head with an inverted structure of the above structure in which the materials of the first and second ferromagnetic layers 4 and 6 are exchanged, that is, with a structure having a first ferromagnetic layer 4 formed of Co-based amorphous with a thickness of approx. 45 nm and a second ferromagnetic layer 6 formed of Co-20% Pt with a thickness of 45 nm was manufactured and the R-H curve thereof was measured. According to the measurement, no discontinuous jump was observed in the curve.

As is clearly understood from the above description, the magnetization of the first ferromagnetic layer for application of the longitudinal bias 4 and that of the second ferromagnetic layer 6 are set in the opposite directions from each other and are magnetostatically coupled. Therefore, the magnetic fluxes generated from the end faces of the ferromagnetic layers 4 and 6 create a closed loop between the ferromagnetic layers and are prevented from entering the magneto-resistive element 1, particularly, the active region (magnetic field sensitive region) thereof, and an influence only by the exchange coupling between the magneto-resistive element 1 and the ferromagnetic layer 4 is given to the magneto-resistive element 1. However, in order to satisfy the above condition, it is necessary to set (saturation magnetization)×(cross sectional region of the end face) of the ferromagnetic layer 4 substantially equal to (saturation magnetization)×(cross sectional region of the end face) of the ferromagnetic layer 6.

The above relation is not limited to a case wherein the longitudinal bias applying ferromagnetic layer is formed of the two-layered structure and can be satisfied even in the multi-layered structure.

The following various combinations of the soft and hard magnetic properties (Hc) of the first and second ferromagnetic layers 4 and 6 may be provided.

| Ferromagnetic layer 4 | hard | soft | soft |
|---|---|---|---|
| Ferromagnetic layer 5 | hard | hard | soft |

A preferable longitudinal bias can be attained even when the magnitude of Hc of the ferromagnetic layer 4 is larger than, smaller than or equal to that of the ferromagnetic layer 6.

Embodiment 3

In the embodiments 1 and 2, a so-called soft film bias by the conductive soft magnetic layer 3 was used in order to apply the operating point bias (i.e., transversal bias). However, as shown in FIG. 4, it is possible to form a non-magnetic conductive layer 8 (for example, Ti, W) instead of the conductive soft magnetic layer 3, pass a current through the layer 8 and apply an operating point bias to the magneto-resistive element 1 by use of the magnetic field created by the current.

The manufacturing process of the MR head is as follows. After forming a magneto-resistive element 1 (NiFe film with a thickness of approx. 30 nm), a hard magnetic layer was formed as the first ferromagnetic layers 4 for the longitudinal bias in the same manner as in the embodiment 1 and was magnetized in one sense (x direction) along the longitudinal direction of the magneto-resistive element 1. Next, a hard magnetic layer was formed as the second ferromagnetic layers 6 for the longitudinal bias over the first ferromagnetic layer 4 with a non-magnetic layer 5 disposed therebetween and was magnetized in a direction (−x direction) opposite to the direction of magnetization of the first ferromagnetic layer 4. Then, the laminated ferromagnetic layers 4 and 6 are patterned to leave only the portions thereof lying on the two end portions of the magneto-resistive element 1 and a non-magnetic conductive layer 8 was formed on the magneto-resistive element 1. Conductive leads 7 were formed on the non-magnetic conductive layer 8 and a current is passed through the conductive leads to apply an operating point bias. With the MR head having the above construction, a preferable reproduced waveform was obtained.

Embodiment 4

Figure 5:
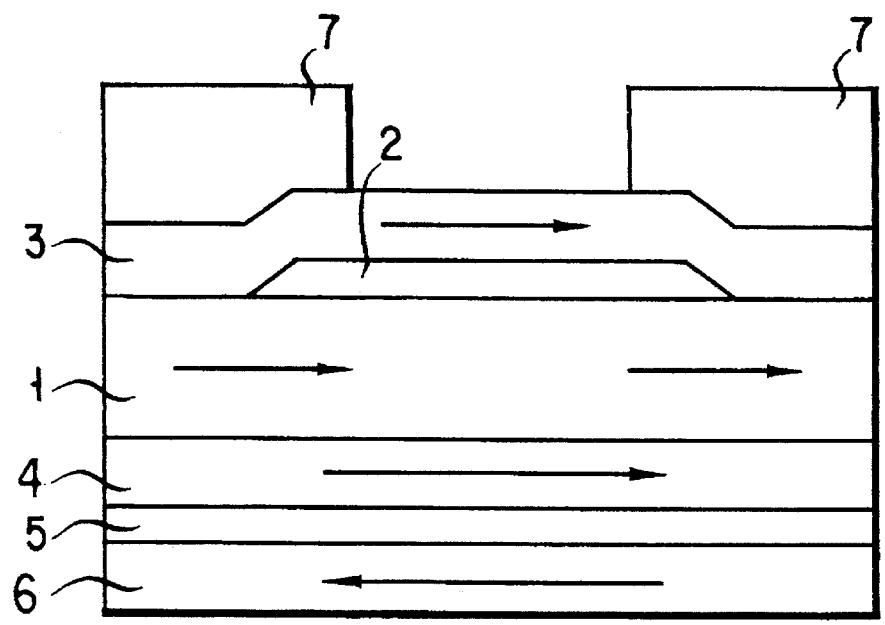
FIG. 5 is a cross sectional view of an MR head according to a fourth embodiment of this invention.

In the embodiments 1 to 3, the MR head having the construction in which the bias ferromagnetic layers 4 and 6 are disposed on the two end portions of the magneto-resistive element 1 was explained. However, as shown in FIG. 5, the bias ferromagnetic layers 4 and 6 may be disposed on the entire surface of the magneto-resistive element 1.

The manufacturing process of the magneto-resistive element 1 is as follows. Hard magnetic layers (Co-20% Pt with a thickness of approx. 25 nm, Hc of 120 kA/m and Br of 0.8 T) serving as the first ferromagnetic layers 4 for application of the longitudinal bias were formed and magnetized in one sense (x direction) along the longitudinal direction of the magneto-resistive element 1. Next, hard magnetic layers (Co-10% Pt with a thickness of approx. 60 nm, Hc of 50 kA/m and Br of 1.4 T) serving as the second ferromagnetic layers 6 for application of the longitudinal bias were formed with non-magnetic layers 5 (SiNx with a thickness of approx. 10 nm) respectively disposed between the ferromagnetic layers 4 and 6 and magnetized in a direction (−x direction) opposite to the direction of magnetization of the ferromagnetic layer 4. Then, after a magneto-resistive element 1 (NiFe film with a thickness of approx. 30 nm and Br of 0.8 T) was formed, a non-magnetic layer 2 (Ti layer with a thickness of approx. 20 nm) was formed only in the central portion which serves as the active region and a conductive soft magnetic layer 3 (Co-based amorphous layer with a thickness of approx. 30 nm and Br of 0.8 T) was formed on the magneto-resistive element 1 and non-magnetic layer 2. Next, the laminated structure was patterned into a preset MR stripe form and then a conductive lead 7 was formed to constitute an MR head.

The MR head of the above structure was used to reproduce a signal recorded on a magnetic disk of metal medium at 1 kFCI and the reproducing characteristic was measured. Like the embodiments 1 to 3, no discontinuous jump was observed in the reproduced waveform and a preferable reproduced waveform which was free from the influence by the Barkhausen noise was obtained. In this embodiment, in order to effect the operating point bias (transversal bias) in the same manner as in the embodiments 1 to 3, the conductive soft magnetic layer 3 formed of Co-based amorphous was formed.

Further, in the MR head with the construction of the embodiment 4, the ferromagnetic layers 4 and 6 for application of the longitudinal bias are formed on the entire surface of the magneto-resistive element 1. Therefore, damage to the magneto-resistive element 1 by over-etching at the time of patterning of the ferromagnetic layers can be suppressed in comparison with a case wherein the ferromagnetic layers for application of the longitudinal bias are formed only on the end portions of the magneto-resistive element 1. Further, damage to the conductive soft magnetic layer 3 for application of the soft film bias can be prevented. This is an advantage in the manufacturing process.

Embodiment 5

In the embodiment 4, the non-magnetic layer 2 and the conductive soft magnetic layer 3 were formed on the magneto-resistive element 1. However, unlike the embodiment 4, in the fifth embodiment shown in FIG. 6, a non-magnetic layer 2 and a conductive soft magnetic layer 3 are formed under the magneto-resistive element 1. With this structure, the same effect as that of the embodiment 4 can be obtained. However, when the magneto-resistive element 1 is formed in the upper position, it is preferable to form the magneto-resistive element 1 in a flat configuration. Therefore, in this case, it is preferable to partly depress the soft magnetic layer 3 by an amount corresponding to the thickness of the non-magnetic layer 2 lying in the interface region between the magneto-resistive element 1 and the conductive soft magnetic layer 3. Further, it is preferable to form the magneto-resistive element 1 on the non-magnetic layer 2 after forming and patterning the non-magnetic layer 2 and then making flat the non-magnetic layer 2 by ion trimming or the like.

The basic design standard for the MR head with the construction described in the embodiments 4 and 5 is that MSSAL+MSMR+MS1=MS2.

In this case, MSMR indicates (saturation magnetic flux density)×(cross sectional region) of the magneto-resistive element 1, MS1 indicates (saturation magnetic flux density)×(cross sectional region) of the ferromagnetic layer 4 for application of the longitudinal bias, MS2 indicates (saturation magnetic flux density)× (cross sectional region) of the ferromagnetic layer 6 for application of the longitudinal bias, and MSSAL indicates (saturation magnetic flux density)×(cross sectional region) of the soft magnetic layer 3.

The lamination order of the ferromagnetic layers 4 and 6 for application of the bias, non-magnetic layer 5, magneto-resistive element 1, and conductive soft magnetic layer 3 may be any one of the following cases (a) to (d):

case (a): magneto-resistive element 1/conductive soft magnetic layer 3/biasing ferromagnetic layer 4-non-magnetic layer 5-biasing ferromagnetic layer 6;

case (b): conductive soft magnetic layer 3/magneto-resistive element 1/biasing ferromagnetic layer 4-non-magnetic layer 5-biasing ferromagnetic layer 6;

case (c): biasing ferromagnetic layer 4-non-magnetic layer 5-biasing ferromagnetic layer 6/conductive soft magnetic layer 3/magneto-resistive element 1; and case (d): biasing ferromagnetic layer 4-non-magnetic layer 5-biasing ferromagnetic layer 6/magneto-resistive element 1/conductive soft magnetic layer 3.

Embodiment 6

In the embodiments 4 and 5, the soft film bias by use of the conductive soft magnetic layer 3 was used to apply the operating point bias. However, as shown in FIG. 7, it is possible to form a non-magnetic conductive layer 8 (for example, Ti, W) instead of the conductive soft magnetic layer 3 and apply the operating point bias to the magneto-resistive element 1 by the magnetic field created by passing a current in the non-magnetic conductive layer 8.

Figure 7:
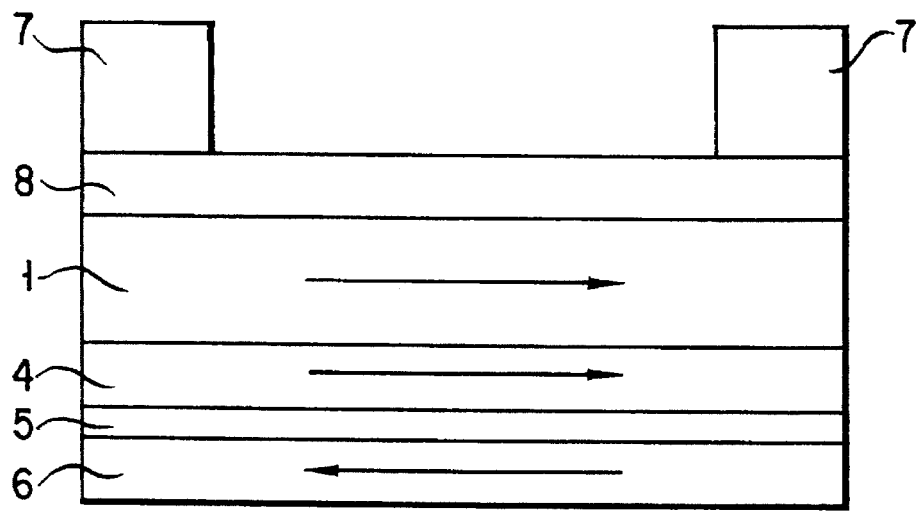
FIG. 7 is a cross sectional view of an MR head according to a sixth embodiment of this invention.

As shown in FIG. 7, the magneto-resistive element 1 is formed on the biasing ferromagnetic layer 4, and the non-magnetic conductive layer 8 is formed on the magneto-resistive element 1 and patterned into a preset stripe form. Conductive leads 7 are formed on the non-magnetic conductive layer 8 to construct an MR head. Also, in this case, a preferable reproduced signal waveform can be obtained.

Embodiment 7

Figure 8:
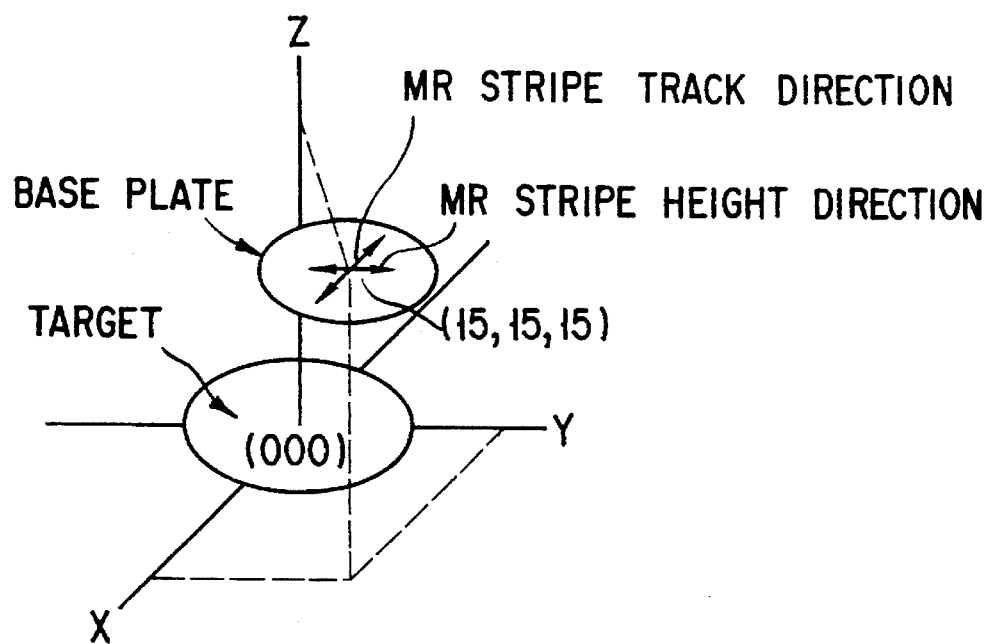
FIG. 8 is a principle diagram of an MR head according to a seventh embodiment of this invention.

FIG. 8 is a principle diagram showing the embodiment 7 and FIG. 9 is a cross sectional view showing the construction of an MR head. In this embodiment, the longitudinal bias is applied to the magneto-resistive element 1 by means of ferromagnetic layers 4 and 6 formed on the magneto-resistive element 1. In this case, it is possible to apply the transversal bias to the magneto-resistive element by giving the in-plane uniaxial anisotropy to the ferromagnetic layers 4 and 6 and suppress bias variation due to fluctuation in the magnetic field of the ferromagnetic layer caused by disturbance and the like. A method of giving the uniaxial magnetic anisotropy is explained with reference to FIG. 8.

A Co-Pt film is formed on the base plate on which the magneto-resistive element 1 is formed as the biasing ferromagnetic layers 4 and 6 by the magnetron RF sputtering method. At this time, the items of the base plate and target are as follows:

Target: Co-20% Pt, 3-inch ϕ;
Base plate: 2-inch ϕ;
Base center setting position: (X, Y, Z) = (0, 0, 0); and
Target center setting position: (X, Y, Z) = (15, 15, 15)   unit: cm where X is an MR stripe track direction, Y is an MR stripe height direction and Z is a vertical direction with respect to the base plate.

That is, the base plate and target were so set that the target center as viewed from the base plate center could be set in a direction which was inclined by 45 degrees with respect to any one of the X, Y and Z directions. First and second ferromagnetic layers 4 and 6 were formed with a non-magnetic layer 5 (SiNx: 5 nm) disposed therebetween with Co-Pt particles obliquely incident on the base plate. It is well known in the art that a column structure grows in an oblique direction by oblique incident particles and the anisotropy is given in the growing direction. In this case, in order to apply the transversal bias to the magneto-resistive element 1, the anisotropy was given to the Co-Pt film grown in an oblique direction (45 degrees with respect to the track direction) on the magneto-resistive element 1. The first ferromagnetic layer 4 (Co-20% Pt: 25 nm) for application of the longitudinal bias and the second ferromagnetic layer 6 (Co-20% Pt: 55 nm) were magnetized in opposite directions.

The magneto-resistive element (NiFe) 1 was formed on the laminated layer to construct an MR head of FIG. 9. The MR head of the above structure was used to reproduce a signal recorded on the magnetic disk of various types of mediums at 1 kFCI and the reproducing characteristic thereof was measured. It was determined that distortion of the reproduced signal waveforms was made less, no discontinuous jump was observed, a preferable transversal bias was applied and the influence by the Barkhausen noise was suppressed.

It was determined that the error rate was improved by forming the ferromagnetic layer for application of the longitudinal bias in a two-layered structure in comparison with a case wherein the ferromagnetic layer for application of the longitudinal bias was formed in a single-layered structure when Hc of the medium of the magnetic disk used for evaluation of the reproducing characteristic of the MR head became low. This trend was significant when the number of laminated layers was large. This indicates that the magnetic field created by the ferromagnetic layer for application of the longitudinal bias becomes weak on the medium surface in the multi-layered structure and the content of the medium cannot be easily erased.

Further, the basic design standard for the above construction is that MSMR+MS1=MS2, where MSMR, MS1 and MS2 respectively indicate (saturation magnetic flux density)×(cross sectional region) of the magneto-resistive element 1, the ferromagnetic layers 4 and 6.

As a method of giving the uniaxial magnetic anisotropy to the biasing ferromagnetic layer, there is provided a method of first forming a base layer of Cr, for example, by the epitaxial growth and forming a hard magnetic layer of CoPt, for example, on the base layer by the epitaxial growth to utilize the crystal magnetic anisotropy in addition to the oblique incident method described before.

Embodiment 8

In the embodiment shown in FIG. 10, the force of exchange coupling between a magneto-resistive element 1 and a ferromagnetic layer 4 can be made adjustable by disposing a non-magnetic layer (atomic layer) 9 between the magneto-resistive element 1 and the ferromagnetic layer 4. In the process of manufacturing the MR head, after the magneto-resistive element 1 was formed and before the biasing ferromagnetic layer 4 was formed, oxygen gas was introduced into the vacuum device and it was left there for several seconds to several minutes. After this, the biasing ferromagnetic layer 4 was formed. The MR head was formed by the above manufacturing process.

The R-H characteristic of the MR head was measured by placing the MR head in such a Helmholtz coil as is explained in the embodiment 3, applying the magnetic field in the track direction. The result of the measurement showed that occurrence of the magnetic field Hx causing the discontinuous jump was less than that observed in a case wherein an MR head was formed without introducing oxygen gas into the interface between the magneto-resistive element 1 and the biasing ferromagnetic layer 4. This may be because the exchange interaction between the magneto-resistive element 1 and the biasing ferromagnetic layer 4 is weakened by means of the non-magnetic layer (oxygen layer) 9 formed on the interface and the intensity of the longitudinal bias magnetic field is reduced. The same effect could be obtained by introducing nitrogen gas or a mixture of nitrogen gas and oxygen gas and effecting the sputtering etching by use of the gas before forming the biasing ferromagnetic layer 4. Thus, the intensity of the longitudinal bias can be adjusted by forming the non-magnetic layer 9 on the interface. Further, mutual diffusion in the interface which might occur with temperature rise in the manufacturing process or at the time of use of the head could be prevented by forming a thermally stable layer on the interface.

Embodiment 9

Figure 6:
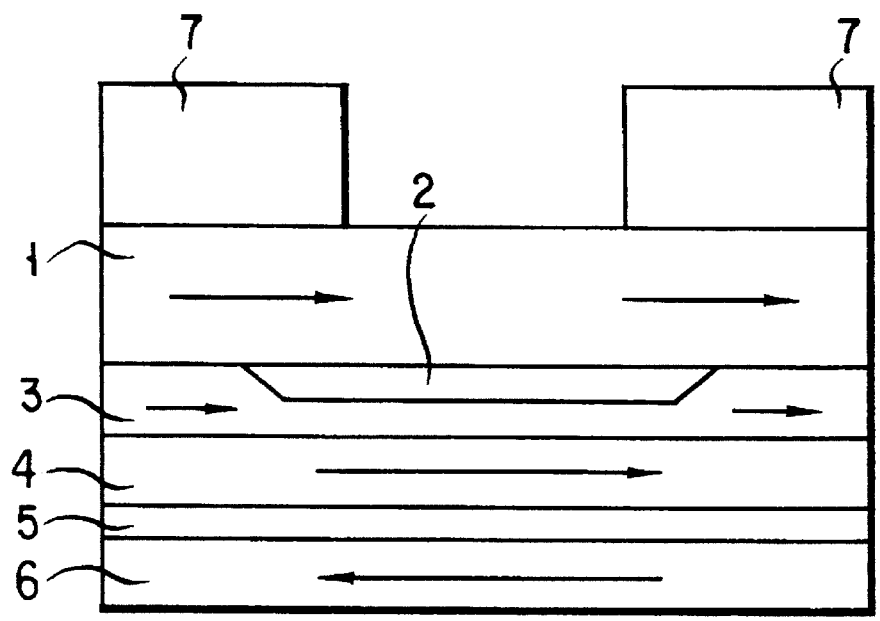
FIG. 6 is a cross sectional view of an MR head according to a fifth embodiment of this invention.
Figure 11:
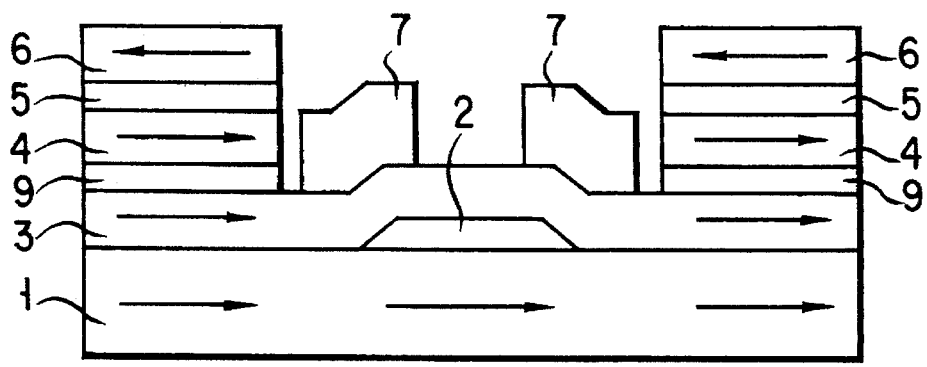
FIG. 11 is a cross sectional view of an MR head according to a ninth embodiment of this invention.

In the embodiment shown in FIG. 11, a non-magnetic layer 9 is formed on the interface between a biasing ferromagnetic layer 4 and a conductive soft magnetic layer 3 for application of soft film bias, and in this embodiment, the same effect as that of the embodiment 7 can be obtained. Further, it is effective to use the non-magnetic layer 9 in the MR head in which the magneto-resistive element 1 or conductive soft magnetic layer 3 is formed in contact with the entire surface of the biasing ferromagnetic layer 4 or 6 as shown in the embodiments of FIGS. 5 and 6.

The same effects as those described in the embodiments 1 to 7 could be obtained in the shield type MR head and yoke type MR head.

Embodiment 10

Figure 12:
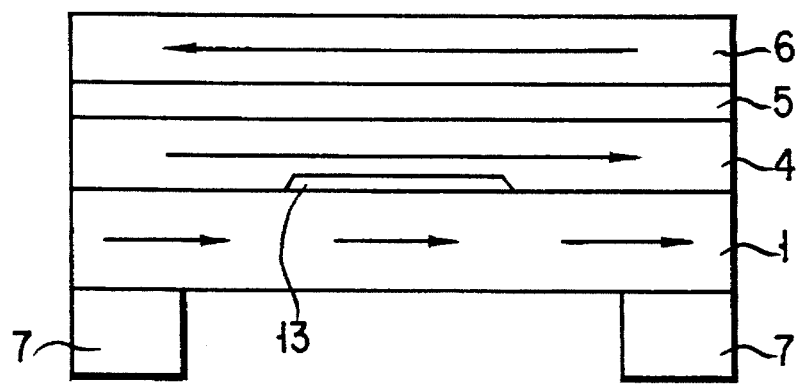
FIG. 12 is a cross sectional view of an MR head according to a tenth embodiment of this invention.

In the embodiment of FIG. 12, a non-magnetic layer 13 is formed only on an active region of the magneto-resistive element 1 and biasing ferromagnetic layers 4 and 6 are laminated with the non-magnetic layer 13 disposed between the magneto-resistive element 1 and the ferromagnetic layer 4 so that the longitudinal bias can be applied by the exchange coupling only in the two end portions (passive regions) of the magneto-resistive element 1.

Embodiment 11

Figure 13:
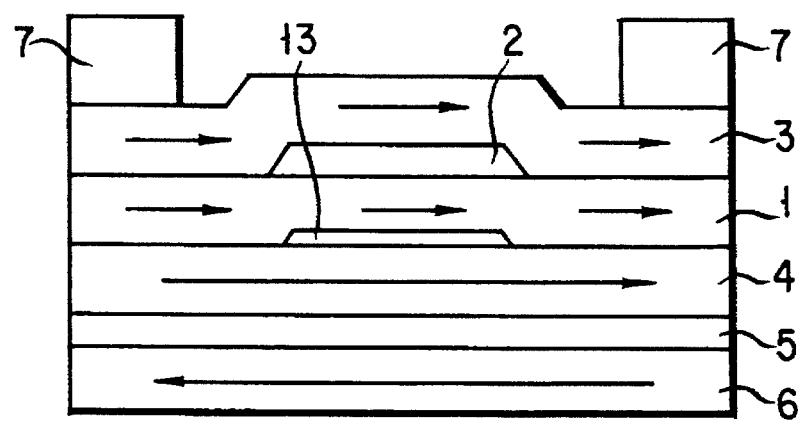
FIG. 13 is a cross sectional view of an MR head according to an eleventh embodiment of this invention.

The embodiment of FIG. 13 is made by applying the construction of the embodiment 9 to a SAL biasing type MR head.

In both of the above embodiments 9 and 10, since the biasing ferromagnetic layers 4 and 6 are formed on the entire surface, an advantage in the manufacturing process that damage to the magneto-resistive element 1 and conductive soft magnetic layer 3 for application of soft film bias caused by over-etching at the time of patterning of the biasing ferromagnetic layers can be suppressed in comparison with a case wherein the biasing ferromagnetic layers are formed only on the end portions of the magneto-resistive element 1 can be obtained.

Embodiment 12

In the embodiment of FIG. 14, biasing ferromagnetic layers 4 and 6 are laminated over the entire surface of the magneto-resistive element 1 with an amorphous soft magnetic layer 15 disposed between the ferromagnetic layer 4 and the magneto-resistive element 1.

Embodiment 13

In the embodiment of FIG. 15, biasing ferromagnetic layers are laminated over the two end portions of the magneto-resistive element 1 with amorphous soft magnetic layers 15 disposed between the ferromagnetic layers and the magneto-resistive element 1.

In both of the embodiments 11 and 12, the magneto-resistive element 1 is formed with the fcc structure, and since the (111) plane thereof is parallel to the film surface, the C axis thereof generally tends to set in the vertical direction with respect to the film surface when a Co-based hard magnetic layer is deposited on the magneto-resistive element 1 as the ferromagnetic layer 4, for example. This means that the vertical direction with respect to the film surface tends to be the easy axis of easy magnetization, and in this case, even if the exchange coupling occurs in the interface between the magneto-resistive element 1 and the ferromagnetic layer 4, the direction of magnetization of the magneto-resistive element 1 tends to be set in the vertical direction with respect to the film surface so that the magnetic permeability of the magneto-resistive element 1 will be significantly reduced. However, if the C axis is forcedly inclined to solve the above problem by controlling the film forming condition of the ferromagnetic layer 4, the exchange coupling force on the interface may be reduced. When the amorphous soft magnetic layer 15 is disposed on the interface between the magneto-resistive element 1 and the ferromagnetic layer 4, a sufficiently strong exchange coupling force can be held on the interface and the C axis of the ferromagnetic layer 4 may tend to be parallel to the film surface.

As described above, according to this invention, by exchange-coupling the magneto-resistive element 1 and the first ferromagnetic layer with each other in the interface, the magnetization of the first ferromagnetic layer is used as the longitudinal bias and the direction of magnetization of the magneto-resistive element 1 is fixed in the direction of magnetization of the first ferromagnetic layer so that occurrence of a partial magnetic domain can be prevented and the Barkhausen noise can be significantly reduced.

Further, by magnetostatically coupling the first and second ferromagnetic layers with each other and with the non-magnetic layer disposed therebetween, the magnetic fluxes generated from the above ferromagnetic layers can be combined to create a closed loop so as to prevent the leakage flux generated from the end portions of the ferromagnetic layer from acting on the medium. Therefore, information recorded on the medium will not be erased by the leakage flux, and since it is difficult for the leakage flux to enter the magneto-resistive element, a constant longitudinal bias can be easily applied to the active region of the MR element and preferable reproducing and responding characteristics can be obtained.

Since the degree of the exchange coupling can be adjusted by disposing the non-magnetic barrier layer on the interface between the first ferromagnetic layer and the magneto-resistive element, the intensity of the longitudinal bias magnetic field can be adequately adjusted, diffusion in the interface between the magneto-resistive element and the ferromagnetic layer caused by heat generated at the time of use of the MR head or in the MR head manufacturing process can be prevented by the presence of the non-magnetic layer, and the reliability of the MR head can be enhanced.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A magneto-resistive head comprising:
   a magneto-resistive element having a first region for sensing a magnetic field and second regions disposed on both sides of said first region;
   conductive leads disposed on said second regions of said magneto-resistive element; and
   a layered structure, including:
   a first ferromagnetic layer magnetized in a preset direction set along the direction of a longitudinal bias created in said magneto-resistive element;
   a non-magnetic layer formed on said first ferromagnetic layer; and
   a second ferromagnetic layer formed on said non-magnetic layer and magnetized in a direction opposite to that of magnetization of said first ferromagnetic layer,
   wherein said first ferromagnetic layer and second ferromagnetic layer are magnetostatically coupled through said non-magnetic layer,
   wherein said magnetoresistive element and said first ferromagnetic layer are exchanged coupled to longitudinally bias said magneto-resistive element to reduce Barkhausen noise behavior, and
   wherein said layered structure includes two layered structures each having a first ferromagnetic layer, a second ferromagnetic layer, and a non-magnetic layer formed therebetween, said two layered structures disposed on respective end portions of said magneto-resistive element in the direction of the longitudinal bias created therein, each of said two layered structures are exchange coupled to said magneto-resistive element to longitudinally bias said magneto-resistive element to reduce Barkhausen noise behavior.

2. A magneto-resistive head according to claim 1, wherein each of said first ferromagnetic layers is magnetized along the longitudinal direction of said magnetic-resistive element.

3. A magneto-resistive head according to claim 1, wherein each of said first ferromagnetic layers is magnetized in a direction inclined with respect to the longitudinal direction of said magneto-resistive element.

4. A magneto-resistive head according to claim 1, further comprising transversal bias creating means for creating a transversal bias in said magneto-resistive element.

5. A magneto-resistive head according to claim 4, wherein said transversal bias creating means is disposed on the surface of said magneto-resistive element on which said exchange coupling is formed.

6. A magneto-resistive head according to claim 4, wherein said transversal bias creating means is disposed on the surface of said magneto-resistive element opposite to the surface at which said exchange coupling is formed.

7. A magneto-resistive head according to claim 4, wherein said transversal bias creating means includes:
   a non-magnetic layer disposed on one surface of the first region for sensing a magnetic field of said magneto-resistive element; and
   a conductive soft magnetic layer covering said non-magnetic layer and one surface of said magneto-resistive element.

8. A magneto-resistive head according to claim 4, wherein said transversal bias creating means includes:
   a non-magnetic layer disposed on one surface of the first region for sensing a magnetic field of said magneto-resistive element; and
   a non-magnetic conductive layer covering said non-magnetic layer and one surface of said magneto-resistive element.

9. A magneto-resistive head according to claim 1, further comprising adjusting means disposed between said magneto-resistive element and each of said first ferromagnetic layers, for adjusting the characteristic of the exchange coupling.

10. A magneto-resistive head according to claim 9, wherein said adjusting means is a non-magnetic layer.

11. A magneto-resistive head according to claim 1, further comprising an amorphous soft magnetic film disposed between said magneto-resistive element and each of said first ferromagnetic layers.

* * * * *